Aug. 6, 1935.  R. E. McINTOSH  2,010,553
EXPANSION SHIELD
Filed July 10, 1934
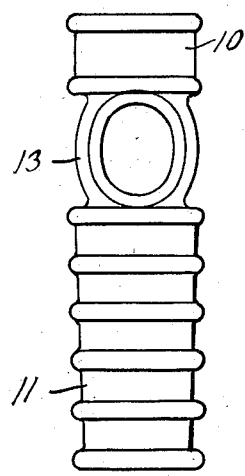
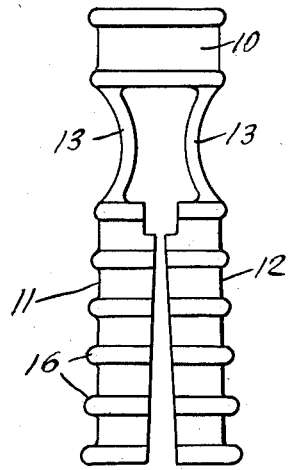
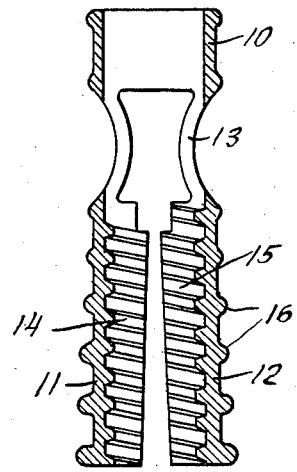
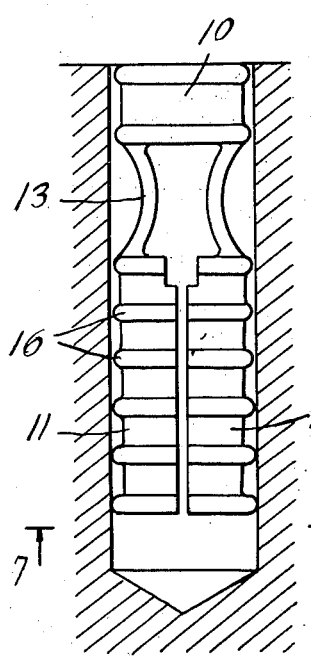
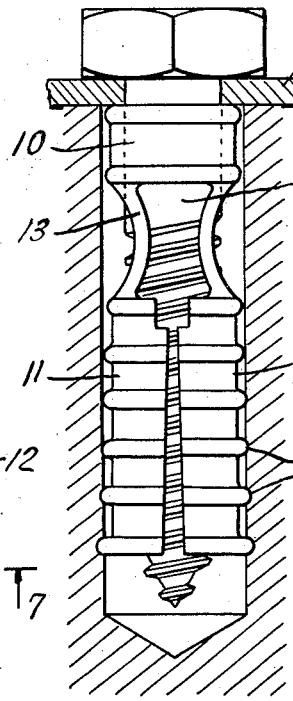
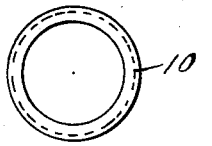
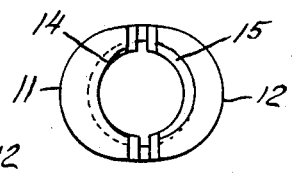
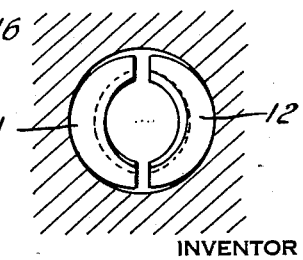
INVENTOR
Roy E. McIntosh
BY
Marshall & Hawley
ATTORNEYS Patented Aug. 6, 1935

2,010,553

UNITED STATES PATENT OFFICE 2,010,553

EXPANSION SHIELD

Roy E. McIntosh, Caldwell, N. J., assignor to Robert E. Ogden, Mountainville, N. Y.

Application July 10, 1934, Serial No. 734,461

3 Claims. (Cl. 85—2.4)

This invention relates to expansion shields adapted to anchor a bolt or lag screw in walls of brick, stone or cementitious material not adapted to directly receive and retain a screw or bolt.

In most bolt anchors for anchoring lag screws the anchor is provided with a tapered bore and when the screw is screwed in the anchor expands into gripping engagement with the wall opening. Until the screw has been partially screwed in and the expansible portions of the shield have been expanded there is nothing to prevent the anchor or shield from turning or rotating in the hole. In other words, there is no initial friction or gripping engagement between the anchor and the wall of the hole or opening.

This invention has for its salient object to provide an anchor, preferably a cast metal anchor, so constructed that it will initially frictionally contact with and engage the wall of the hole prior to any expansion thereof by the screw or expanding member.

Another object of the invention is to provide an anchor so constructed that when expanded it will have a firm gripping engagement with the wall of the hole or opening.

Further objects of the invention will appear from the following specification taken in connection wtih the drawing which forms a part of this application, and in which Fig. 1 is an elevational view of an expansion shield constructed in accordance with the invention;

Fig. 2 is an elevational view taken at right angles to Fig. 1;

Fig. 3 is a longitudinal sectional elevation of the expansion shield;

Fig. 4 is an end elevation of the outer end of the shield;

Fig. 5 is an end elevation of the inner end of the shield;

Fig. 6 is an elevational view showing the shield in its initial position in a wall opening;

Fig. 7 is a sectional elevation taken through the wall opening and showing the inner end of the shield in elevation, this view being taken substantially on line 7—7 of Fig. 6; and Fig. 8 is an elevational view similar to Fig. 6 but showing the shield expanded by a lag screw.

The invention briefly described consists of an expansion shield or bolt anchor comprising a plurality of expansible sections or portions which are connected together at one end and are initially sprung apart into diverging relation with respect to each other. The expansible sections are resiliently connected to the outer end of the shield and are internally threaded to receive a lag screw or bolt. The threads are so formed that the threaded opening in the shield will be substantially cylindrical when the expansible portions are disposed in their initial diverging relation. In use the expansible portions of the shield are pressed toward each other when the shield is inserted in the wall opening and automatically spring apart after insertion so that the outer surface of the shield will have an initial frictional contact or engagement with the wall of the opening. When the expansible portions are contracted the threaded opening in the shield is likewise contracted and is tapered from the outer to the inner end thereof so that the expanding element or lag screw will force the expansible portions away from each other and into firm gripping engagement with the wall opening as it is screwed into the shield.

Further details of the invention will appear from the following description.

In the particular embodiment of the invention illustrated in the drawing the expansion shield is preferably formed of cast metal and comprises a cylindrical band or ring 10 at the outer end thereof, a pair of expansible portions or sections 11 and 12 and a plurality of relatively narrow arms or strips or members 13 which connect each of the expansible portions 11 and 12 to the band or ring 10. The portions 13 are resilient and, as shown in the drawing, are narrow and much smaller in cross section than the parts which they connect. As shown in Figs. 2 and 3, the expansible portions 11 and 12 are normally sprung apart and disposed in diverging relation with respect to each other.

The portions 11 and 12 are internally threaded, as shown at 14 and 15, and as will be clear from the illustration in Fig. 3 the threaded opening is substantially cylindrical when the sections 11 and 12 are disposed in their normal diverging relation.

The sections 11 and 12 have formed on their outer surfaces a series of parallel concentric circular ribs 16 and these ribs may, as shown in Fig. 2, be gradually increased in thickness from the outer toward the inner end of the shield. On the other hand, the internal threads 14 and 15 are uniform in thickness throughout the threaded portion of the shield.

In use the shield is contracted or the sections 11 and 12 are pressed toward each other when the shield is inserted in a hole or wall opening, as shown in Fig. 6. The resiliency of the material, however, and particularly of the connecting webs 13, 13 causes the sections 11 and 12 to be pressed outwardly into initial frictional engagement with the surface of the opening, as shown in Fig. 6.

Fig. 8 illustrates the shield expanded in the wall opening by a lag screw S which is threaded into the shield and retains a member 17 in position on the wall between the head of the lag screw and the outer end of the shield. It will be clear from this figure that the expansible elements or sections 11 and 12 have been forced apart into firm gripping engagement with the wall opening.

Although one specific embodiment of the invention has been particularly shown and described it will be understood that the invention is capable of modification and that changes in the construction and in the arrangement of the various cooperating parts may be made without departing from the spirit and scope of the invention, as expressed in the following claims.

What I claim is:

1. An integral expansion shield comprising a plurality of expansible portions and having a threaded opening therein, each of said portions being connected at their outer ends to an integral ring by a plurality of relatively narrow arms, said expansible portions being initially resiliently sprung apart to present an outer surface outwardly flared toward the inner end of the anchor, said arms being smaller in cross section than the parts to which they are connected, the threaded opening being substantially cylindrical and the longitudinal openings between expansible portions being divergent toward the inner end of the shield when the expansible portions are sprung apart.

2. An expansion shield having a substantially cylindrical outer end and a plurality of expansible portions formed integral therewith and each connected thereto by a plurality of spaced resilient members relatively small in section with respect to the parts connected thereby, said portions being normally disposed in outwardly diverging relation to each other and being internally threaded to receive a threaded element to be anchored therein.

3. An expansion shield having a substantially cylindrical outer end and a plurality of expansible portions formed integral therewith and each connected thereto by a plurality of spaced resilient members relatively small in section with respect to the parts connected thereby, said portions being normally disposed in outwardly diverging relation to each other and being internally threaded to receive a threaded element to be anchored therein, the internal thread being substantially cylindrical when the portions diverge away from each other.

ROY E. McINTOSH.

CERTIFICATE OF CORRECTION.

Patent No. 2,010,553. August 6, 1935.

ROY E. McINTOSH.

It is hereby certified that the name of the assignee in the above numbered patent was erroneously written and printed as "Robert E. Ogden" whereas said name should have been written and printed as Ralph E. Ogden, as shown by the records of assignments in this office; and that the said Letters Patent should be read with this correction therein that the same may conform to the record of the case in the Patent Office.

Signed and sealed this 10th day of September, A. D. 1935.

(Seal)

Leslie Frazer
Acting Commissioner of Patents.